July 28, 1936.　　　C. W. ANDERSON　　　2,049,038
MENSTRUAL PHASE RECORDER AND INDICATOR
Filed May 14, 1934
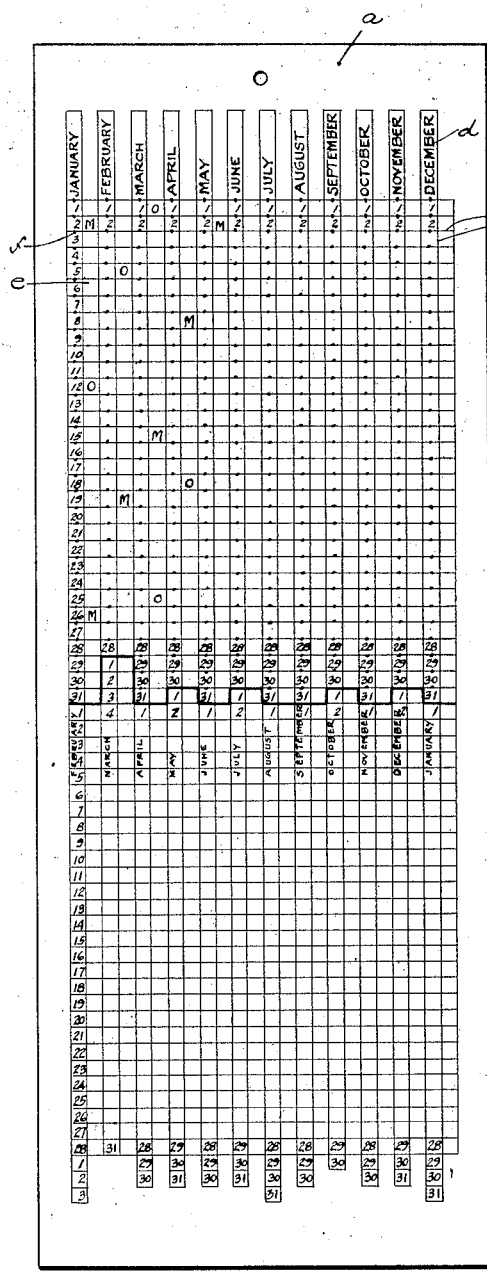
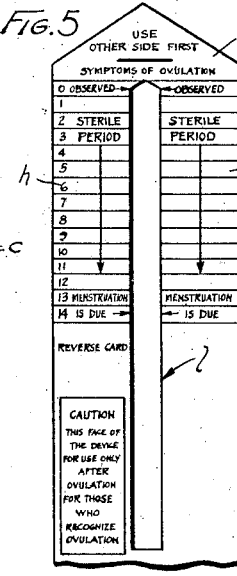
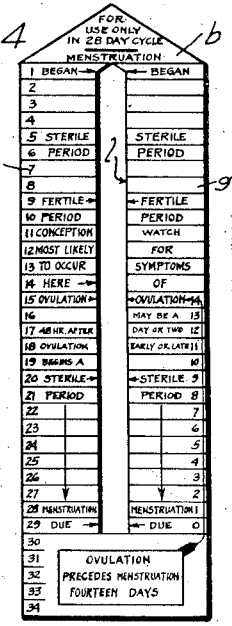
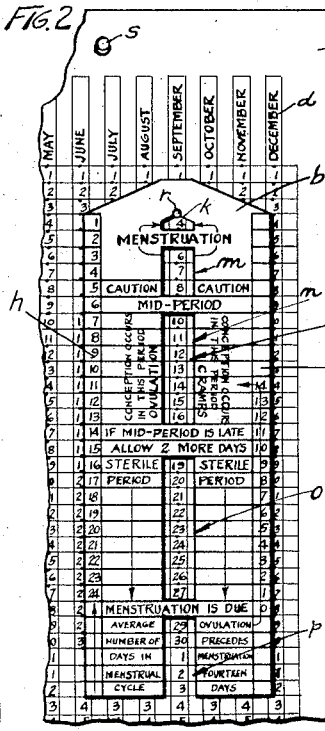
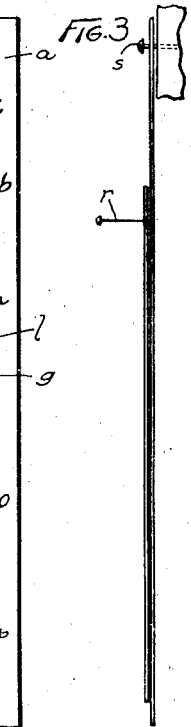
INVENTOR
Cyrus Walfred Anderson
BY
Ivan D. Thornburgh
ATTORNEY Patented July 28, 1936

2,049,038

UNITED STATES PATENT OFFICE 2,049,038

MENSTRUAL PHASE RECORDER AND INDICATOR

Cyrus Walfred Anderson, Denver, Colo.

Application May 14, 1934, Serial No. 725,581

6 Claims. (Cl. 40—107)

My present invention relates to a combined menstrual phase recorder and indicator for the human female and has as an important objective the provision of a convenient means of charting a record of past menstrual events of a particular individual over a period of time and the provision of an associated supplementary indicating device which, when formed in accordance with certain principles as shown by the record and when used with such a chart, indicates phases of a future menses cycle for that individual, the entire story of both past and future menstrual phase happenings thereupon being discernible at a glance and providing an accurate future guide for the particular female involved.

This menstrual phase recorder and indicator utilizes certain principles set forth in my United States Patent Number 1,983,062 on Medical arts sterility slide rule.

The present invention contemplates the use for physiological purposes, of a combined record and indicator which comprises a record time chart on which are printed or otherwise applied, consecutive numbers indicative of the days for a calendar year, these numbers being duplicated and so associated that an uninterrupted sequence may be followed from month to month and a menstrual cycle included in each month division. Such a chart also provides for a time record of past menstrual events of a particular human female for which the device becomes individually adaptable with the keeping of the record.

In use a blank chart is first submitted to an individual female by her physician and after sufficient knowledge is obtained from the record by the physician, he prescribes for that individual and prepares the second feature of the device according to such prescription.

This second feature comprises an indicating card or other unit having divisions set forth in accordance with the prescription. This indicating card when properly applied to and used with the record chart immediately gives an indication of the days of fertility, sterility, ovulation and beginning of menstruation for that female for her next succeeding menses cycle.

Numerous other objects and advantages of the invention will be apparent as it is better understood from the following description, which, taken in connection with the accompanying drawing, discloses a preferred embodiment thereof.

Referring to the drawing wherein is disclosed singly and combined all of the elements of one embodiment of the invention:

Figure 1 is a face view of a record time chart element;

Fig. 2 is a face view of an indicating member element together with a part of its corresponding record time chart element, the two elements being assembled to forecast a menstrual cycle for a certain date;

Fig. 3 is a longitudinal or edge view of the parts shown in Fig. 2;

Fig. 4 is a face view of a slightly modified indicating member element prepared according to a different prescription from that of the indicating member element of Fig. 2; and Fig. 5 is a reverse view of the element of Fig. 4 partly broken away.

The present embodiment of the invention as disclosed in the drawing comprises a combined recorder and indicator for determining and indicating past and future menstrual phases of a human female and consists in its broad conception of two elements both of which may be composed of cardboard or other suitable thin material.

The first element is a record time chart $a$ (Fig. 1) and the second a supplementary indicating card $b$ (Figs. 2 and 3). The chart $a$ is first used as a record on which an individual female sets down in suitable spaces the various happenings of her menses cycle phases as they transpire over a period preferably of two or more months or until her physician is satisfied that he has sufficient data to prepare the card $b$ to suit her individual case.

After the card is prepared she continues to keep a full menstrual phase record on the chart and in addition by applying the card to the chart (Fig. 2) as instructed by her physician she is able by the combined use of these two elements to tell in advance throughout the year the dates on which she may expect the different phases of her future menstruation cycles.

The time chart $a$ (Fig. 1) is divided vertically and horizontally by lines $c$ printed or otherwise applied to the face of the chart. There are twenty four vertical rows of spaces and at the top of the alternate rows are the names $d$ of the months of the year. For example the first month January is printed at the top of the first row and each alternate row from left to right is designated by the succeeding months.

In the first row beginning at the top and reading down the thirty one days of January are indicated, this being in the upper part of the chart. Directly under the last day beginning again with the numeral one the days of February are successively given this being in the lower part of the chart.

In the third vertical row under the name February, beginning at the top and reading down, the twenty eight numerals for the days in that month are given. In the lower half of the chart and beginning under the last day of February are the thirty one days of March.

In this way each vertical row contains spaces for the days of at least two successive months. The upper half of the chart therefore contains all of the days of the calendar year and these days are duplicated by those in the lower part of the chart. The reason for this duplication will appear later. To avoid confusion some of the date numerals are omitted in the drawing.

At the right of each vertical date row is a vertical row of blank spaces e and these spaces are used for the record referred to. Such a record may be made in any suitable manner as by placing an initial or other indicating character opposite the proper time space. For example, as shown in Fig. 1 the letter "M" is used to denote the beginning of menstruation.

The record for the individual using the chart shown, therefore, indicates that her menstruations began on January 2nd, January 26th, February 19th, March 15th, April 8th, etc. In such a record the letter "O" is used to indicate the time of ovulation and this for the example given, occurs on January 12th, February 5th, March 1st, March 25th, April 18th, etc.

Points of reference f for each date in the upper section of the chart may be provided and in the form herein disclosed are made by dots placed on the line over the date space and centrally thereof. These points of reference are used later for properly positioning the card b. They may be dispensed with and the individual rely on date numerals but they do provide a convenience which will be further pointed out hereinafter.

The physician observing the record, such as is now being considered, immediately concludes that the female making the same is regular in her menses and that she has a regular twenty four day menstrual cycle. He accordingly prepares the card b (Fig. 2) for use with the record.

In practice cards b may be printed for each of the different menstrual cycles ranging from twenty days as a minimum to thirty three days as a maximum or the physician may make up his own card. Fig. 2 shows a card for a twenty four day cycle while Fig. 4, in addition to showing a slight modification, is based on a twenty eight day cycle.

In any event the card b is divided by horizontal lines into spaces g and along the left margin numerals h beginning with one and reading down are arranged in a vertical row. The spaces g are the same width as the date and record spaces on the chart a. The longitudinal center of the card is cut away to provide window indicating elements or window divisions and these windows take a slightly different form in the two figures.

In the vertical center of the card of Fig. 2 and in horizontal alignment with the No. 1 space g a reference opening k may be formed. Directly below and in vertical alignment and located along the center of the card are four spaced windows l. The vertical height of each window and the spacing between windows in this type of card changes according to the length of menses period and these windows are formed in accordance with certain physiological principles hereinafter set forth.

To simplify the description of operation the four windows l are further and individually designated by the letters m, n, o, and p as considered from the top reading down. Other suitable printed matter is placed on the card b for a purpose now to be explained.

In preparing a card b for a 24-day menstrual cycle, for example, the window m is located to extend in horizontal alignment with the h numeral spaces 3, 4, and 5 there being a single space of the card left between the top of this window and window k. Window n is also spaced the same distance below the window m and extends from top to bottom in horizontal alignment with the h numerals 7 to 13, inclusive. Two spaces are then left between the bottom of the window n and the top of the window o, the latter extending from top to bottom in horizontal alignment with the h numerals 16 to 24, inclusive. The bottom of the window o is located one space from the top of the window p, the latter being open at its bottom.

Spacing used in a card for a 28-day cycle will be slightly greater. In that case the windows m, n, o, and p will extend in horizontal alignment with the h numerals respectively 3 to 8 for m, 10 to 18 for n, and 19 to 28 for o. Other menstrual cycles will take other slight variations in accordance with the total number of days involved.

In the example illustrated in Fig. 2 a twenty four day card is used. Suppose, for example, the beginning of the last menstrual cycle of the individual occurred on September 4th and knowledge of the future cycle phases was desired. The card b is placed on the chart a on that date as is shown in Fig. 2. A convenient way of doing this is by placing a pin r in the reference point f on the chart for the date of September 4th and hanging the pocket k of the card b over the pin. The date of September 4th now appears in the opening of the pocket.

Both chart and card are then preferably hung on a nail or pin s extending out from the wall or in other suitable manner. The dates immediately following September 4th may be read down centrally of the card and certain of the date figures may be seen through the windows m, n, o, and p. These figures give the forecast for the coming menstrual phases for the next succeeding cycle.

The upper window m is a "post menstrual sterility period" window. Below it is an "ovulation" window, this being window n which, as indicated by the lettering on the face of the card, covers also a conception period. Window o is a "pre-menstrual sterility period" and at the top of window p is a space for the date of beginning of the next menstrual cycle. Referring to Fig. 2 and considering further the example of the individual looking ahead for her future menstrual phases it will be observed that September 6th to 8th, inclusive, is a sterile time, that conception is most likely between September 10th to 16th, inclusive, and that ovulation is due on September 14th. September 19th to 27th, inclusive, is also a sterile period and the following menses are due on September 29th.

The example just considered assumes a regular performance but often ovulation is late a day or two or it may be more and there are times when ovulation is early. Undue exercise of the female at certain times alters these periods. Not all females at first can recognize the phenomenon of ovulation in their own lives but it is believed that this knowledge can be easily acquired under the guidance of the physician and as a part of his prescription service.

As indicated on the face of the card b the beginning of a menses follows fourteen days after the proceeding ovulation. In the case of an irregular performance, therefore, adjustment must be made between the card and the chart if the next beginning of menstruation date is to be correct. One way to make such a shift in position is to remove the pin r, move the card b up or down until the arrow on the right of the window n is opposite the date of ovulation. The pin r is accordingly shifted to a corrected point of reference.

A more simplified procedure, however, is provided for and this relates to a certain legend printed on the reverse side of the card b. Inasmuch as the modified type of card illustrated in Fig. 4 also utilizes this feature further description on this subject will be given later after considering the effect of a different prescriptive set-up which can best be explained in connection with Fig. 4.

Practically the only difference between the form (exclusive of period of menstruation cycle) of the cards b in the two Figs. 2 and 4 is in the form of window l. In the modified form of Fig. 4 the physical divisions between the individual windows are dispensed with and a single window l combines the opening k and the four windows m, n, o, and p. The operation, however, is exactly the same and actual division of the date numerals of the chart a are still observed by the printed divisions alongside of the window space. This will be made clearer by considering the twenty eight day cycle period set-up of the card b of Fig. 4.

Considering the same point of beginning as above, that is, Sept. 4th, the card of Fig. 4 when assembled with the chart of Fig. 1 will have the top of the long window l (in horizontal alignment with the words "began") adjacent that date, the card being hung on the pin as before. The first eight days, therefore, are a sterile period, as indicated on the face of the card and this sets off eight spaces instead of the five days (space k, and window m, "post menstrual sterility period") in the previous twenty four day example. The present period then is from Sept. 4th to Sept. 11th.

The conception period for the twenty eight day person begins on the 9th day after beginning of menstruation, that is, Sept. 13th, and is likely to run until the 20th day, that is, Sept. 24th. This includes the "ovulation" period and this division corresponds to the ovulation window n of the multiple window type of card. The "premenstrual sterility period" corresponding to the reading shown in window o here includes the eight days following Sept. 24th or until Oct. 1st. Finally, at the bottom of the window l we find a space corresponding to the window p which gives the date of beginning of the next menses as Oct. 2nd.

In a similar manner for other periods, the single window divisions or the multiple windows l of the cards b are formed but the relative divisions of the length of time set off for the various parts of a cycle are always based on the average menstrual cycle of twenty four, twenty eight or any other number of days as the particular prescription may show.

Fig. 5 shows the reverse or rear side of the card b. Its use is the same whether it is the multiple or the single window card. It is for providing a greater convenience to those patients who have come to recognize ovulation. On this reverse face of the card are fourteen divisions indicated on both sides of the window l. The top of the window is hung over the pin r so that the exact day of ovulation is in the top of the window. Where the multiple window card b is used this will correspond to the window k.

Opposite the fourteenth space below, the arrows indicate the exact date of beginning of the next menses as is clearly shown in the drawing. This provides a convenient way of adjusting for dates when the female becomes irregular as referred to above and the date adjustment must be made.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

1. A combination menstrual phase recorder and indicator device for keeping past records of phase periods of fertility, sterility, ovulation and menstruation of a human female and for determining future phases, which comprises a record time chart having divided spaces corresponding to the days of the calendar year for keeping a record of menstrual phase events of an individual female, and an indicating member having a longitudinally disposed window, said window having window indicating elements on one side provided longitudinally of said window in accordance with the prescriptive formula of the said female and indicating future dates for the fertility, sterility, ovulation and beginning of menstruation of the next menstrual cycle of said female when said indicating member is applied to said time chart, said indicating member also having window indicating elements longitudinally of said window and on another side of said member for correcting the reading of the device when there is irregularity of ovulation during any menstrual cycle, such correction giving a definite point of menstruation beginning for the next succeeding menstrual cycle and thus providing record data which may be recorded on said record time chart.

2. A combination menstrual phase recorder and indicator for keeping past records of phase periods of fertility, sterility, ovulation and menstruation of the human female and for determining future phases, which comprises a record time chart having sections corresponding to the calendar days for keeping a running record of the past menstrual phases and for providing a basis for future determinations, and a detachable indicating member having sections corresponding in width to the day sections of said time chart and also having a centrally disposed opening the over-all length of the opening including that number of sections which is equal to the number of days in one complete menstrual cycle of the particular individual female as determined by her time chart record, said opening having window division elements arranged to indicate the future date of each phase in the menstrual cycle of that female individual when said indicating member is applied to said time chart.

3. A combination menstrual phase recorder and indicator for keeping past records of phase periods of fertility, sterility, ovulation and menstruation of the human female and for determining future phases, which comprises a record time chart having sections corresponding to the calendar days and having spaces associated with the said time sections for keeping a running record of past menstrual phases of an individual female, and a detachable indicating member having transversely disposed sections, each section corresponding in width to the day sections of said time chart and also having a centrally disposed opening, the over-all length of which is equal to that number of day sections which correspond to one complete menstrual cycle of the particular individual female as determined by her record appearing on said time chart, said opening having window indicating division elements which are relatively arranged to indicate the future dates of phases of said female menstrual cycle when said indicating member is applied to said time chart, in which position the corresponding day sections of the latter appear in said indicating member opening so that the phase dates are then readable in accordance wth said window indicating division elements.

4. A combination menstrual phase recorder and indicator for keeping past records of phase periods of fertility, sterility, ovulation and menstruation of the human female and for determining future phases, which comprises a record time chart having sections corresponding to the calendar days and having spaces associated with the said time sections for keeping a running record of past menstrual phases of an individual female, and a detachable indicating member having transversely disposed sections, each section corresponding in width to the day sections of said time chart and also having a plurality of longitudinal centrally aligned openings, the longitudinal space covered by all of the openings being equal to that number of day sections which correspond to one complete menstrual cycle of the particular individual female for which said phase recorder and indicator is designed, each opening having a window indicating division element and being disposed in predetermined relation to adjacent openings to indicate the future dates of the individual phases of said female menstrual cycle when said indicating member is applied to said time chart.

5. A combination menstrual phase recorder and indicator for keeping past records of phase periods of fertility, sterility, ovulation and menstruation of a human female and for determining future phases, which comprises a record time chart having printed indications in duplicate of the days of the year, said daily indications being grouped in the upper part of the chart into vertical subdivisions corresponding to the months of the year and each month being followed in the same vertical alignment and in the lower part of the chart by duplicate indications of the days of the next succeeding month, each day in the upper daily subdivisions having a space for a record of the past menstrual phase event occurring on that date, and an indicating member having transversely disposed sections, each section corresponding in width to the day sections of said time chart and also having a centrally disposed opening the over-all length of which is equal to that number of day sections which correspond to one complete menstrual cycle of the particular individual female for which the phase recorder and indicator is provided, said opening acting as a window for dates on said record time chart when said indicating member is applied thereto and including the full menstrual period in single vertical alignment, said indicating member also having window indicating division elements for said opening so that the future dates of all individual phases of menstruation are shown.

6. A combination menstrual phase recorder and indicator for keeping past records of phase periods of fertility, sterility, ovulation and menstruation of the human female and for determining future phases, which comprises a record time chart having sections corresponding to the calendar days, and a detachable indicating member having transversely disposed sections corresponding in width to the day sections of said time chart and also having a longitudinal centrally disposed opening which extends longitudinally over a space equal to that occupied by all of the day sections corresponding to one complete menstrual cycle of the particular individual female for which said phase recorder and indicator is designed, said openings having window division elements arranged to indicate the future dates of the individual phases of said female menstrual cycle when said indicating member is applied to said time chart, sad detachable indicating member also having other window indicating elements formed on a reverse side thereof and utilizing said longitudinal opening when said indicating member is reversed and re-applied to said time chart, for disclosing corrected dates of menstruation phases as referenced from the actual observed ovulation date just passed.

CYRUS WALFRED ANDERSON.